(12) United States Patent
Baccouche et al.

(10) Patent No.: US 9,630,651 B1
(45) Date of Patent: Apr. 25, 2017

(54) B-PILLAR ASSEMBLY FOR VEHICLE BODY

(71) Applicant: Ford Global Technologies, LLC, Dearborn, MI (US)

(72) Inventors: Mohamed Ridha Baccouche, Ann Arbor, MI (US); Rahul Arora, Birmingham, MI (US); Saeed David Barbat, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/226,951

(22) Filed: Aug. 3, 2016

(51) Int. Cl.
| | | |
|---|---|---|
| *B62D 21/15* | (2006.01) | |
| *B62D 25/04* | (2006.01) | |
| *B62D 29/04* | (2006.01) | |
| *B62D 25/20* | (2006.01) | |

(52) U.S. Cl.
CPC ........... *B62D 21/157* (2013.01); *B62D 25/04* (2013.01); *B62D 29/04* (2013.01); *B62D 25/2036* (2013.01)

(58) Field of Classification Search
CPC ... B62D 21/157; B62D 25/04; B62D 25/2036
USPC ..................................................... 296/193.06
See application file for complete search history.

(56) References Cited

U.S. PATENT DOCUMENTS

| | | | | |
|---|---|---|---|---|
| 5,246,264 | A * | 9/1993 | Yoshii | B62D 25/04 296/1.03 |
| 8,029,047 | B2 * | 10/2011 | Kim | B62D 25/04 296/187.12 |
| 8,177,292 | B1 | 5/2012 | Baccouche et al. | |
| 2012/0256445 | A1 | 10/2012 | Baccouche et al. | |

FOREIGN PATENT DOCUMENTS

CN        204937248 U     1/2016

* cited by examiner

*Primary Examiner* — Joseph D Pape
(74) *Attorney, Agent, or Firm* — Jason C. Rogers; Brooks Kushman P.C.

(57) ABSTRACT

A b-pillar assembly for a vehicle is provided. The b-pillar assembly includes a vehicle body, a steel T-bracket, a carbon fiber b-pillar inner, a b-pillar outer, and a carbon fiber b-pillar reinforcement. The vehicle body includes a roof rail. The steel T-bracket includes a first portion for securing to the roof rail and a second portion extending perpendicularly therefrom and including a hinge member. The carbon fiber b-pillar inner includes a first upper end secured to the first portion of the steel T-bracket and a first lower end secured to a rocker. The b-pillar outer includes a second upper end secured to the roof rail and a second lower end secured to the rocker. The carbon fiber b-pillar reinforcement is disposed between the b-pillar inner and the b-pillar outer. The hinge member is oriented to deform to absorb a portion of a load applied to the roof rail.

20 Claims, 5 Drawing Sheets

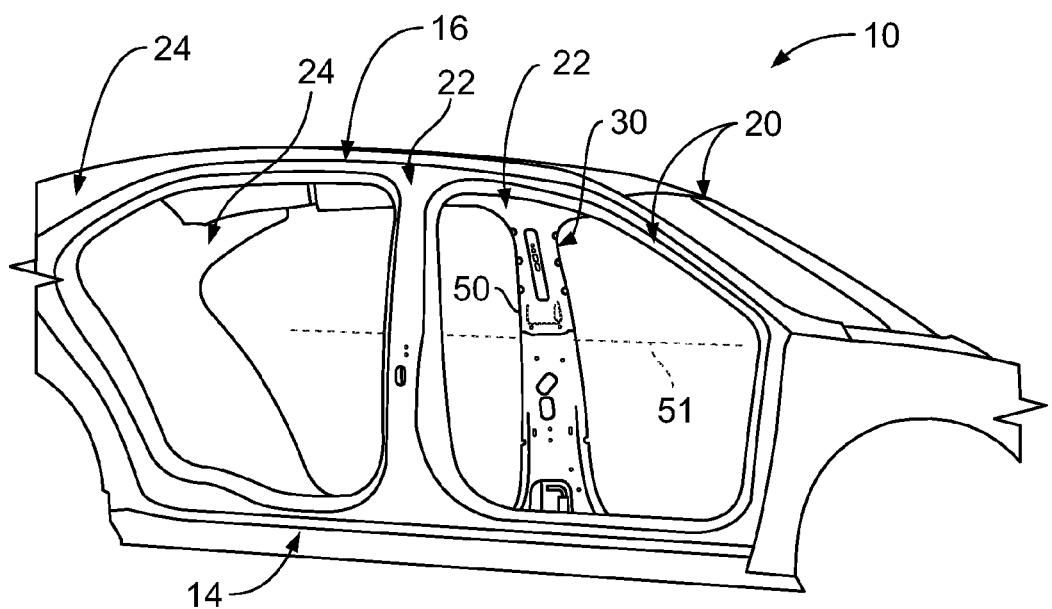
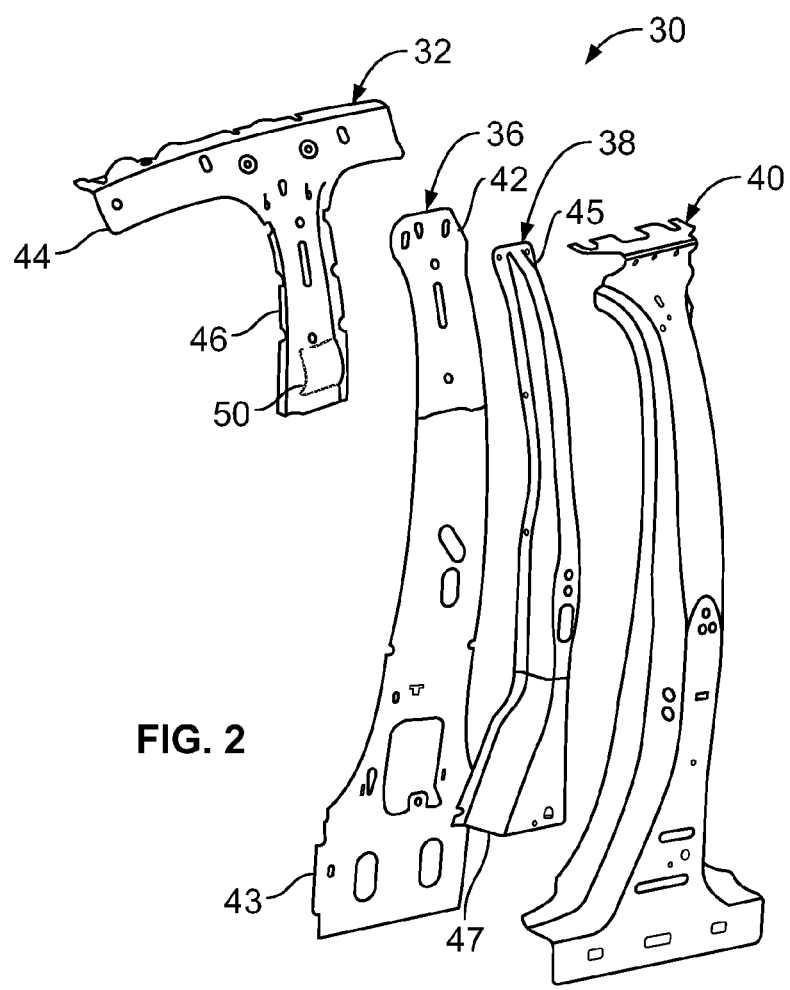
FIG. 1
FIG. 2

B-PILLAR ASSEMBLY FOR VEHICLE BODY

TECHNICAL FIELD

This disclosure relates to structural reinforcement components for b-pillar assemblies of vehicles.

BACKGROUND

B-pillar assemblies of automotive vehicles are tested for performance under impacts such as a side impact test and a roof crush test. The b-pillar assemblies may have various components made of various materials. For example, the components may be of steel or carbon fiber. Carbon fiber components typically weigh less than steel components and as such may provide for improved vehicle fuel economy. Difficulties may arise when carbon fiber is used for components which are typically made of steel. A lack of ductility in the carbon fiber components may prevent desired deformation performance of the b-pillar assembly during the side or roof impacts.

This disclosure is directed to solving the above problems and other problems as summarized below.

SUMMARY

According to an aspect of the present disclosure, a b-pillar assembly for a vehicle includes a vehicle body, a steel T-bracket, a carbon fiber b-pillar inner, a b-pillar outer, and a carbon fiber b-pillar reinforcement. The vehicle body includes a roof rail. The steel T-bracket includes a first portion for securing to the roof rail and a second portion extending perpendicularly therefrom and including a hinge member. The carbon fiber b-pillar inner includes a first upper end secured to the first portion of the steel T-bracket and a first lower end secured to a rocker. The b-pillar outer includes a second upper end secured to the roof rail and a second lower end secured to the rocker. The carbon fiber b-pillar reinforcement is disposed between the b-pillar inner and the b-pillar outer. The T-bracket is arranged with the vehicle body such that the hinge member deforms to absorb a portion of a load applied to the roof rail. The vehicle body may include a beltline extending fore and aft along the vehicle and through a central region of the b-pillar assembly. The second portion of the steel T-bracket may extend perpendicularly from the first portion a predetermined length such that the hinge member is located above the beltline. The second upper end of the b-pillar inner may define a first thickness and the second lower end may define a second thickness greater than the first thickness. The first thickness may be between 2.2 millimeters and 3.0 millimeters and the second thickness may be between 3.5 millimeters and 4.2 millimeters. A portion of the b-pillar inner in which the second upper end and the second lower end meet is located adjacent a beltline extending fore and aft along the vehicle and through a central region of the b-pillar assembly. The b-pillar reinforcement may include a first end defining a first thickness and a second end adjacent the rocker defining a second thickness less than the first thickness.

According to another aspect of the present disclosure, a vehicle b-pillar assembly includes a steel T-bracket and a carbon fiber b-pillar inner. The steel T-bracket includes an upper portion secured to a roof rail and a lower portion extending perpendicularly therefrom and defining a hinge member. The carbon fiber b-pillar inner is mounted to the T-bracket and extends between the rail and a vehicle rocker. The T-bracket is arranged with the rail to orient the hinge member above a vehicle beltline and receive a load when the rail receives an impact. A carbon fiber b-pillar reinforcement is mounted to an outboard side of the b-pillar inner. The carbon fiber b-pillar reinforcement may include a first end defining a first thickness and a second end adjacent the vehicle rocker defining a second thickness less than the first thickness. A steel b-pillar outer may be mounted to an outboard side of the b-pillar reinforcement and span between the rail and the vehicle rocker. The lower portion of the T-bracket may extend toward the rocker such that the hinge member is adjacent the vehicle beltline. The carbon fiber b-pillar may include an upper end defining a first thickness and a lower end defining a second thickness greater than the first thickness. The lower portion of the T-bracket may be arranged with the rail such that hinge member bends when the rail receives an impact.

According to a further aspect of the present disclosure, a vehicle body includes a b-pillar region and a b-pillar assembly. The b-pillar region spans between a roof rail and a rocker. The b-pillar assembly is mounted to the vehicle body at the b-pillar region. The b-pillar assembly includes a steel T-bracket, a b-pillar inner, a b-pillar reinforcement, and a steel b-pillar. The steel T-bracket is mounted to the roof rail and extends toward the rocker. The b-pillar inner is mounted to the T-bracket at the roof rail and the rocker. The b-pillar reinforcement member is mounted to the b-pillar inner. The steel b-pillar outer is mounted to the b-pillar reinforcement member, the roof rail, and the rocker. The b-pillar inner and the b-pillar reinforcement are made of a carbon fiber material and arranged with the T-bracket and b-pillar outer such that the carbon fiber material and steel material are oriented relative to one another to simulate an all steel b-pillar assembly under a roof crush load. The steel T-bracket may define a hinge member located above a beltline defined as a location substantially midway between the roof rail and the rocker. The steel T-bracket may define a hinge member located above a beltline defined at a location just below and adjacent a lower end of the steel T-bracket. The steel T-bracket may include a hinge member defining a cross-section extending inboard relative to the vehicle and located on the steel T-bracket above a beltline of the vehicle. The vehicle body of claim 15, wherein the b-pillar reinforcement includes a first end defining a first thickness between 3.5 millimeters and 4.2 millimeters and a second end adjacent the rocker defining a second thickness between 2.2 millimeters and 3.0 millimeters. The b-pillar inner may include a first end defining a first thickness between 2.2 millimeters and 3.0 millimeters and a second end defining a second thickness between 3.5 millimeters and 4.2 millimeters.

BRIEF DESCRIPTION OF THE DRAWINGS

FIG. 1 is a fragmentary perspective view of an example of a vehicle body.

FIG. 2 is an exploded view of a pillar assembly of the vehicle body of FIG. 1.

DETAILED DESCRIPTION

Figure 4:
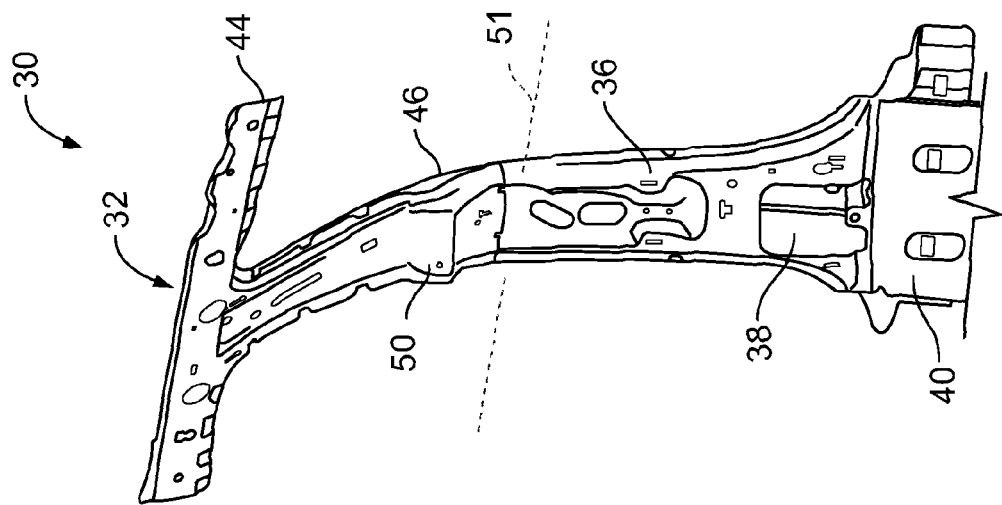
FIG. 4 is a perspective view of the pillar assembly of FIG. 2 shown assembled.
Figure 3:
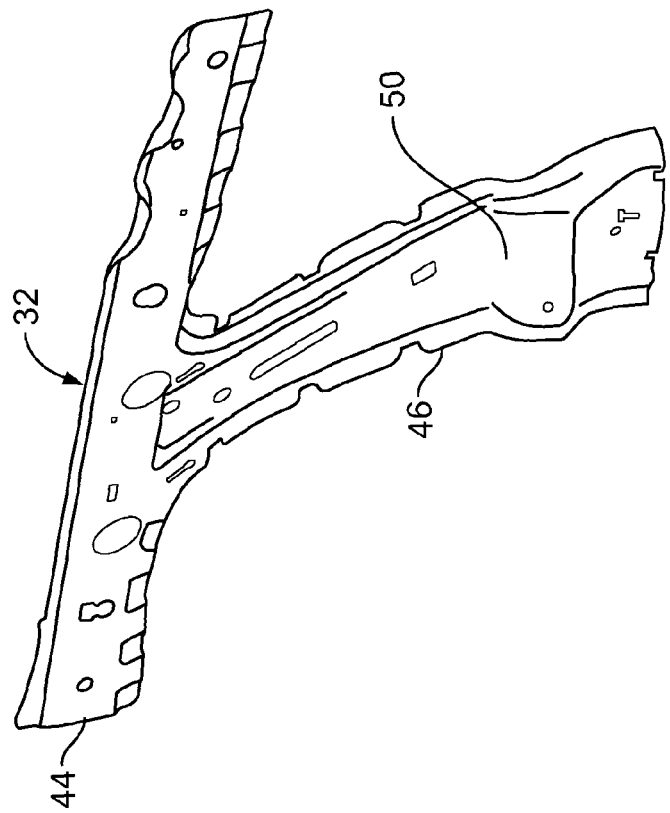
FIG. 3 is a perspective view of a T-bracket of the pillar assembly of FIG. 2.

Embodiments of the present disclosure are described herein. It is to be understood, however, that the disclosed embodiments are merely examples and other embodiments can take various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ embodiments of the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

FIG. 1 illustrates an example of a portion of a vehicle body referred to generally as a vehicle body 10 herein. The vehicle body 10 includes rocker panels 14 spaced from roof rails 16. Pillars extend between the rocker panels 14 and the roof rails 16. For example, the vehicle body 10 includes a-pillars 20, b-pillars 22, and c-pillars 24. The a-pillars 20 are spaced from one another and partially define an opening for a front windshield. The a-pillars 20, the b-pillars 22, the rocker panels 14, and the roof rails 16 define an opening for a front door. The b-pillars 22, the c-pillars 24, the rocker panels 14, and the roof rails 16 define an opening for a rear door.

FIG. 2 illustrates an example of components of a b-pillar assembly. Two b-pillar assemblies 30 are mounted to the vehicle body 10 at the b-pillars 22. Each of the b-pillar assemblies 30 includes a T-bracket 32, a b-pillar inner 36, a b-pillar reinforcement 38, and a b-pillar outer 40. The T-bracket 32 and the b-pillar outer 40 may be made of a material including high ductility characteristics, such as boron steel. The b-pillar inner 36 and the b-pillar reinforcement 38 may be made of a material including low ductility characteristics, such as carbon fiber. The b-pillar inner 36 includes an upper end 42 for securing to the T-bracket 32 and a lower end 43 for securing to the rocker panel 14. The upper end 42 may define a first thickness and the lower end 43 may define a second thickness greater than the first thickness. For example, the upper end 42 may define a thickness between 2.2 mm and 3.0 mm and the lower end 43 may define a thickness between 3.5 mm and 4.2 mm.

The b-pillar reinforcement 38 includes an upper end 45 and a lower end 47. The upper end 45 defines a third thickness and the lower end 47 defines a fourth thickness. For example, the upper end 45 may define a thickness between 3.5 mm and 4.2 mm and the lower end 47 may define a thickness between 2.2 mm and 3.0 mm. The b-pillar reinforcement 38 may define a substantially u-shaped profile adapted to be inserted within a corresponding shape of the b-pillar outer 40.

In previous examples of b-pillar assemblies, each of the components may have been made of steel or aluminum only. Thus, a transition to a usage of carbon fiber for one or more of the components of the b-pillar assembly 30 provides a weight reduction to the vehicle body 10. This weight reduction provides advantages, such as an improvement to fuel economy. A hinge member is moved from a b-pillar inner to the T-bracket 32 to assist in facilitating the weight reduction.

Referring to FIGS. 3 through 6, the T-bracket 32 includes an upper portion 44 adapted to mount to the roof rail 16, and a lower portion 46 including a hinge member 50. The lower portion 46 extends perpendicularly from the upper portion 44. A portion of the T-bracket 32 extends inboard relative to the vehicle body 10 to define the hinge member 50. For example, the hinge member 50 defines a side profile that is substantially arced in shape. The T-bracket 32 is mounted to the respective roof rail 16 such that the hinge member 50 is oriented above a beltline 51 of the vehicle body 10. The beltline 51 of the vehicle body 10 is defined as a location extending fore to aft along the vehicle body 10 located midway between the rocker panels 14 and the roof rails 16, or midway between an upper end and a lower end of the b-pillar outer 40. The beltline 51 of the vehicle body 10 may be at a location of an upper portion of a front or rear door (not shown) and a lower portion of a window (not shown) mounted to the front or rear door. The T-bracket 32 may be arranged with the vehicle body 10 such that the hinge member 50 receives a portion of a load applied to the roof rail portion 16 of the vehicle body 10. For example, the T-bracket 32 may bend at the hinge member 50 in response to application of a load to absorb the impact force of the load. A load from a roof crush test is an example of the load applied to the roof rail portion 16.

Figure 5C:
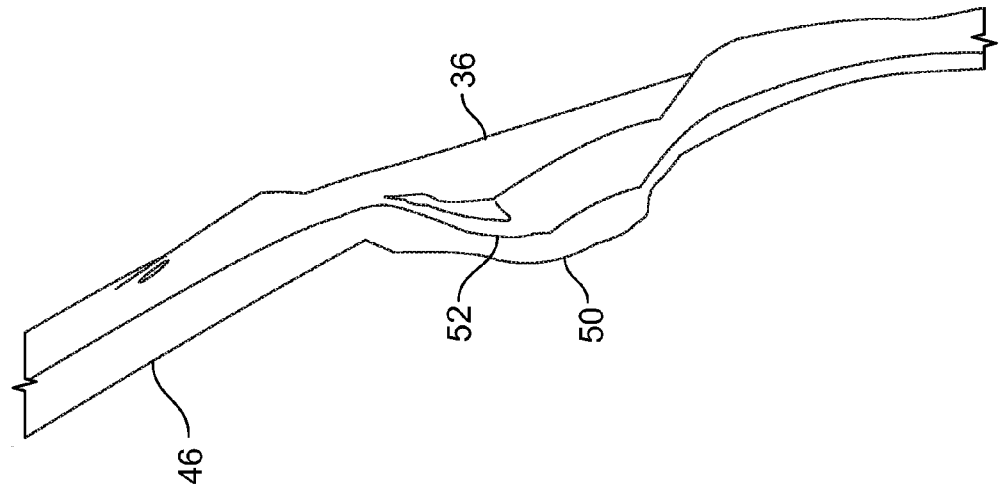
FIG. 5C is a detailed front view of a portion of the T-bracket of FIG. 5A after the pillar assembly of FIG. 2 receives a load.
Figure 5B:
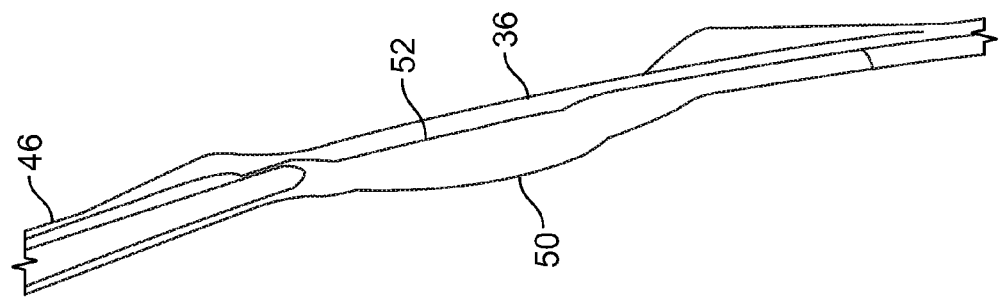
FIG. 5B is a detailed front view of a portion of the T-bracket of FIG. 5A prior to the pillar assembly of FIG. 2 receiving a load.
Figure 5A:
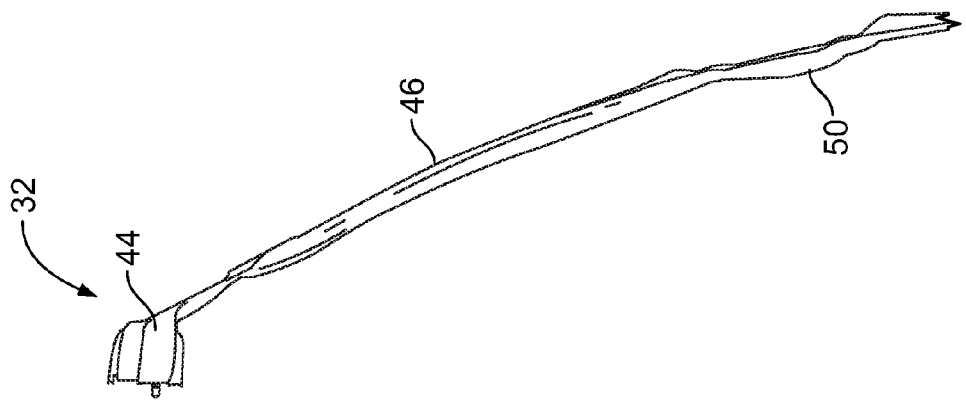
FIG. 5A is a front view of the T-bracket of the pillar assembly of FIG. 2 and an inner reinforcement member of the pillar assembly of FIG. 2.

FIGS. 5A through 5C illustrate further details of the hinge member 50 of the T-bracket 32. FIG. 5A is a front view of the T-bracket 32. FIG. 5B is a detailed front view of the hinge member 50 prior to a load being applied to the vehicle body 10 and FIG. 5C is a detailed front view of the hinge member 50 after a load is applied to the vehicle body 10. An edge 52 of the hinge member 50 is shown deformed in FIG. 5C in comparison with the edge 52 as shown in FIG. 5B. The edge 52 deforms so the T-bracket 32 assists in absorbing the load received by the T-bracket 32 as a result of the load applied to the vehicle body 10. For example, the edge 52 of the hinge member 50 may assist in absorbing loads applied to the roof rail 16 by initiating a hinging action above the beltline 51 or midway between the roof rail 16 and the rocker panel 14. The lower portion 46 of the steel T-bracket 32 extends perpendicularly from the upper portion 44 a predetermined length such that the hinge member 50 is located above the beltline 51.

Figure 6:
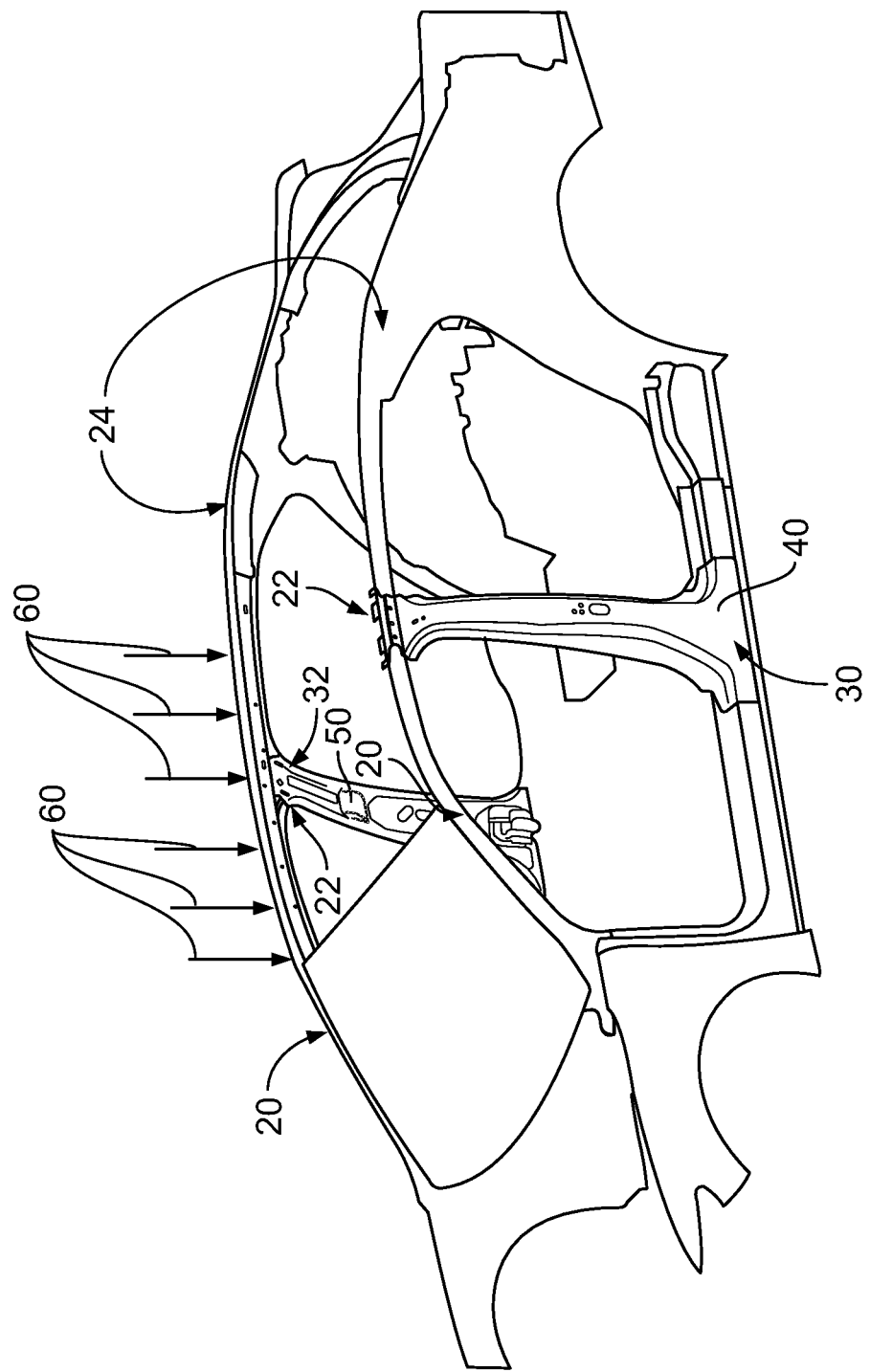
FIG. 6 is another perspective view of the vehicle body of FIG. 1 showing force arrows representing a load applied to a portion of a roof rail.

FIG. 6 illustrates an example in which the vehicle body 10 receives a load at one of the roof rails 16, represented by force arrows 60. Force arrows 60 are representative of the load applied during the roof crush test. In the roof crush test, the b-pillar assembly 30 is tested for a predetermined amount of resilience relative to the load received by the roof rail portion 16. For example, during an Insurance Institute for Highway Safety (IIHS) roof crush test, the strength of a vehicle body is evaluated by pushing a metal plate against one side of a roof rail, such as the roof rails 16, at a slow and constant speed. A force applied relative to the vehicle's weight is known as a strength-to-weight ratio. This ratio varies as the test progresses. A peak strength-to-weight ratio recorded at any time before the metal plate advances 5 inches is the standard for measuring roof strength.

A good rating requires a strength-to-weight ratio of at least 4. A b-pillar assembly, such as the b-pillar assembly 30, assists in achieving the desired strength-to-weight ratio. Location of a hinge member, such as the hinge member 50, within the b-pillar assembly provides an area where forces are directed and associated crash energy may be absorbed through bending of the hinge member 50 as shown in FIG. 5C. For example, the vehicle body, such as the vehicle body 10, is intended to withstand a force of at least 4 times the vehicle's weight before the plate crushes the roof by 5 inches. For an acceptable rating, the minimum required strength-to-weight ratio is 3.25. For a marginal rating, the strength-to-weight ratio is 2.5 and anything lower is considered a poor rating.

Figure 7:
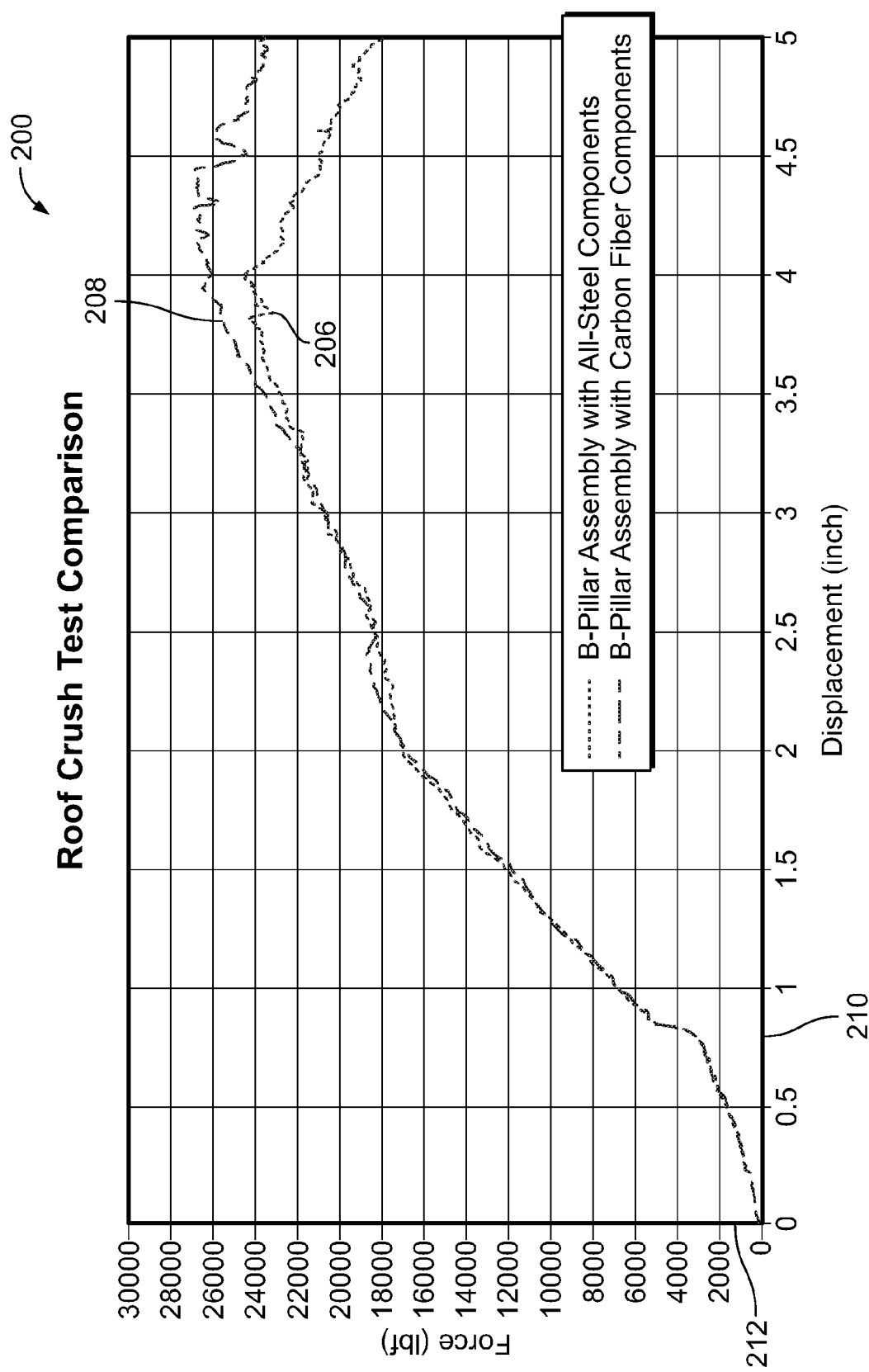
FIG. 7 is a graph illustrating a performance comparison of two b-pillar assemblies subject to a roof crush test.

FIG. 7 is a graph comparing two b-pillar assemblies during a model of the IIHS roof crush test, referred to generally as a graph 200. A first plot 206 represents a performance of a b-pillar assembly including a steel reinforcement component having a hinge member of a component separate from a steel T-bracket. A second plot 208 represents a performance of a b-pillar assembly including carbon fiber reinforcement components in which the T-bracket includes a hinge member, such as is the case with the b-pillar assembly 30. X-axis 210 represents a displacement of a fixture of the IIHS roof crush test which impacts a force, such as the force represented by force arrows 60 in FIG. 6. Y-axis 212 represents the load or force applied by the fixture under the roof crush test. The plots illustrate an amount of force required to displace the fixture according to the Y-axis 212 depending upon the resiliency of the vehicle and vehicle components. Thus, the graph 200 illustrates the similarity between the amount of force needed to displace the fixture for the two different types of b-pillar assemblies. For example, the b-pillar assembly of plot 208 would be acceptable for vehicles with a weight of up to 6,625 lbs. (26,500 lbf/4) and the b-pillar assembly of plot 206 would be acceptable for vehicle with a weight of up to 6,125 lbs. (24,500 lbf/4).

In this example, the first plot 206 and the second plot 208 are substantially similar through applications of zero to 22000 lbf. An amount of force to displace the fixture is similar during this portion of the roof crush test. Following the 22000 lbf mark the first plot 206 and the second plot 208 separate from one another. The graph 200 shows via the first plot 206 and the second plot 208 a scenario in which the b-pillar assembly with carbon fiber reinforcement components may receive an increased load to move the fixture in comparison to the b-pillar assembly including the steel reinforcement component. The graph 200 thus supports a finding that the second plot 208 represents a strength-to-weight ratio of an equal or a higher value for the b-pillar assembly including carbon fiber components compared to the first plot 206 representing the b-pillar assembly with all steel components. Locating the hinge member 50 on the T-bracket 32 satisfies performance requirements in terms of the IIHS roof crush test.

While various embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated.

While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A b-pillar assembly for a vehicle comprising:
   a vehicle body including a roof rail;
   a steel T-bracket including a first portion for securing to the roof rail and a second portion extending perpendicularly therefrom and including a hinge member;
   a carbon fiber b-pillar inner including a first upper end secured to the first portion of the steel T-bracket and a first lower end secured to a rocker;
   a b-pillar outer including a second upper end secured to the roof rail and a second lower end secured to the rocker; and
   a carbon fiber b-pillar reinforcement disposed between the b-pillar inner and the b-pillar outer, wherein the T-bracket is arranged with the vehicle body such that the hinge member deforms to absorb a portion of a load applied to the roof rail.

2. The assembly of claim 1, wherein the vehicle body includes a beltline extending fore and aft along the vehicle and through a central region of the b-pillar assembly.

3. The assembly of claim 2, wherein the second portion of the steel T-bracket extends perpendicularly from the first portion a predetermined length such that the hinge member is located above the beltline.

4. The assembly of claim 1, wherein the second upper end of the b-pillar inner defines a first thickness and the second lower end defines a second thickness greater than the first thickness.

5. The assembly of claim 4, wherein the first thickness is between 2.2 millimeters and 3.0 millimeters and the second thickness is between 3.5 millimeters and 4.2 millimeters.

6. The assembly of claim 4, wherein a portion of the b-pillar inner in which the second upper end and the second lower end meet is located adjacent a beltline extending fore and aft along the vehicle and through a central region of the b-pillar assembly.

7. The assembly of claim 1, wherein the b-pillar reinforcement includes a first end defining a first thickness and a second end adjacent the rocker defining a second thickness less than the first thickness.

8. A vehicle b-pillar assembly comprising:
   a steel T-bracket including an upper portion secured to a roof rail and a lower portion extending perpendicularly therefrom and defining a hinge member; and
   a carbon fiber b-pillar inner mounted to the T-bracket extending between the roof rail and a vehicle rocker, wherein the T-bracket is arranged with the roof rail to orient the hinge member above a vehicle beltline and receive a load from a roof rail impact.

9. The assembly of claim 8 further comprising a carbon fiber b-pillar reinforcement mounted to an outboard side of the b-pillar inner.

10. The assembly of claim 9, wherein the carbon fiber b-pillar reinforcement includes a first end defining a first thickness and a second end adjacent the vehicle rocker defining a second thickness less than the first thickness.

11. The assembly of claim 9 further comprising a steel b-pillar outer mounted to an outboard side of the b-pillar reinforcement and spanning between the rail and the vehicle rocker.

12. The assembly of claim 8, wherein the lower portion of the T-bracket extends toward the rocker such that the hinge member is adjacent the vehicle beltline.

13. The assembly of claim 8 further, wherein the carbon fiber b-pillar includes an upper end defining a first thickness and a lower end defining a second thickness greater than the first thickness.

14. The assembly of claim 8, wherein the lower portion of the T-bracket is arranged with the rail such that hinge member bends when the rail receives an impact.

15. A vehicle body comprising:
- a b-pillar region spanning between a roof rail and a rocker; and
- a b-pillar assembly mounted to the vehicle body at the b-pillar region comprising
  - a steel T-bracket mounted to the roof rail and extending toward the rocker,
  - a b-pillar inner mounted to the T-bracket at the roof rail and the rocker,
  - a b-pillar reinforcement member mounted to the b-pillar inner, and
  - a steel b-pillar outer mounted to the b-pillar reinforcement member, the roof rail, and the rocker,
- wherein the b-pillar inner and the b-pillar reinforcement are made of a carbon fiber material and arranged with the T-bracket and b-pillar outer such that the carbon fiber material and steel material are oriented relative to one another to simulate an all steel b-pillar assembly under a roof crush load.

16. The vehicle body of claim 15, wherein the steel T-bracket defines a hinge member located above a beltline defined as a location substantially midway between the roof rail and the rocker.

17. The vehicle body of claim 15, wherein the steel T-bracket defines a hinge member located above a beltline defined at a location just below and adjacent a lower end of the steel T-bracket.

18. The vehicle body of claim 15, wherein the steel T-bracket includes a hinge member defining a cross-section extending inboard relative to the vehicle and located on the steel T-bracket above a vehicle beltline.

19. The vehicle body of claim 15, wherein the b-pillar reinforcement includes a first end defining a first thickness between 3.5 millimeters and 4.2 millimeters and a second end adjacent the rocker defining a second thickness between 2.2 millimeters and 3.0 millimeters.

20. The vehicle body of claim 15, wherein the b-pillar inner includes a first end defining a first thickness between 2.2 millimeters and 3.0 millimeters and a second end defining a second thickness between 3.5 millimeters and 4.2 millimeters.

* * * * *